United States Patent
Takahashi et al.

(10) Patent No.: US 10,189,116 B2
(45) Date of Patent: Jan. 29, 2019

(54) LASER MACHINING HEAD

(71) Applicant: Panasonic Intellectual Property Management Co., Ltd., Osaka (JP)

(72) Inventors: Wataru Takahashi, Osaka (JP); Yasushi Mukai, Osaka (JP); Yiheng Kung, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/023,389

(22) PCT Filed: Mar. 9, 2015

(86) PCT No.: PCT/JP2015/001258
§ 371 (c)(1),
(2) Date: Mar. 20, 2016

(87) PCT Pub. No.: WO2015/136907
PCT Pub. Date: Sep. 17, 2015

(65) Prior Publication Data
US 2016/0368091 A1 Dec. 22, 2016

(30) Foreign Application Priority Data
Mar. 13, 2014 (JP) .................................. 2014-049644

(51) Int. Cl.
*B23K 26/14* (2014.01)
*B23K 26/064* (2014.01)
(Continued)

(52) U.S. Cl.
CPC ........ *B23K 26/1464* (2013.01); *B23K 26/064* (2015.10); *B23K 26/142* (2015.10); *B23K 26/1476* (2013.01); *B23K 26/389* (2015.10)

(58) Field of Classification Search
CPC ................ B23K 26/064; B23K 26/142; B23K 26/1464; B23K 26/1476; B23K 26/1462; B23K 26/1482
(Continued)

(56) References Cited

U.S. PATENT DOCUMENTS 5,756,962 A * 5/1998 James ................ B23K 26/0648
219/121.6
6,426,479 B1 7/2002 Bischof
(Continued)

FOREIGN PATENT DOCUMENTS

CN 1098742 1/2003
DE 10 2010 049 460 3/2012
(Continued)

OTHER PUBLICATIONS

International Search Report of PCT application No. PCT/JP2015/001258 dated May 19, 2015.
(Continued)

*Primary Examiner* — Ibrahime A Abraham
*Assistant Examiner* — Spencer H Kirkwood
(74) *Attorney, Agent, or Firm* — Wenderoth, Lind & Ponack, L.L.P.

(57) ABSTRACT

A laser machining head includes a collimation lens, a focusing lens, and a nozzle unit. The nozzle unit includes a protective member, an inner nozzle, an outer nozzle, a nozzle holding section, and an orifice. The outer nozzle is disposed outside the inner nozzle and the nozzle holding section holds the inner nozzle and the outer nozzle. The orifice is in contact with the inner nozzle and is interposed between the nozzle holding section and the outer nozzle. The nozzle holding section has a first gas path connecting the air supply port disposed in the nozzle holding section and the orifice. The orifice has a third gas path for connecting a
(Continued)

second gas path disposed between the inner nozzle and the outer nozzle, and the first gas path. In the vicinity of the tip of the nozzle unit, an opening connected to the second gas path is disposed.

9 Claims, 6 Drawing Sheets

(51) Int. Cl.
 *B23K 26/142* (2014.01)
 *B23K 26/382* (2014.01)
(58) Field of Classification Search
 USPC .............. 219/121.75, 121.6, 121.84, 121.67, 219/121.63, 121.64, 121.74, 121
 See application file for complete search history.

(56) References Cited

U.S. PATENT DOCUMENTS

| | | | |
|---|---|---|---|
| 2006/0261047 A1* | 11/2006 | Fukunaka | B23K 31/125 219/121.63 |
| 2013/0233836 A1* | 9/2013 | Dackson | B23K 26/1476 219/121.64 |

FOREIGN PATENT DOCUMENTS

| | | | | |
|---|---|---|---|---|
| DE | 102010049460 A1 | * | 3/2012 | ............ B23K 26/08 |
| JP | 59-180880 U | | 12/1984 | |
| JP | 62-199286 U | | 12/1987 | |
| JP | 63-034590 U | | 3/1988 | |
| JP | 5-123886 | | 5/1993 | |
| JP | 10-216977 | | 8/1998 | |
| JP | 2000-126888 | | 5/2000 | |
| JP | 2000-158170 | | 6/2000 | |
| JP | 2000-225488 | | 8/2000 | |
| JP | 2004-148360 | | 5/2004 | |
| JP | 2005-118818 | | 5/2005 | |
| JP | 2007-175738 | | 7/2007 | |
| JP | 2012-000648 | | 1/2012 | |
| JP | 2012-002750 | | 1/2012 | |
| JP | 2012000648 A | * | 1/2012 | |
| JP | 2012-024811 | | 2/2012 | |
| JP | 2013-052440 | | 3/2013 | |

OTHER PUBLICATIONS

English translation of Search Report dated Jun. 29, 2017 in related Chinese Patent Application No. 201580002259.2.
The Extended European Search Report dated Dec. 12, 2016 for the related European Patent Application No. 15761563.4.

* cited by examiner (a)

(b)

(a)

(b)

(c)

LASER MACHINING HEAD

CROSS-REFERENCE TO RELATED APPLICATIONS

This application is a U.S. national stage application of the PCT International Application No. PCT/JP2015/001258 filed on Mar. 9, 2015, which claims the benefit of foreign priority of Japanese patent application 2014-049644 filed on Mar. 13, 2014, the contents all of which are incorporated herein by reference.

TECHNICAL FIELD

The present disclosure relates to a structure of a laser machining head for laser welding by radiating a laser beam from a position away from a machining point to the machining point.

BACKGROUND ART

In recent years, a machining method, called a remote laser machining method, has been drawing attention. In the remote laser machining method, laser welding is performed by radiating a laser beam from a position away from a machining point to the machining point, using a laser beam having a long focal length. Generally, the laser machining head used for the remote laser machining has a condensing lens in the upper part and has a nozzle unit fitted at the tip in the lower part. The laser beam introduced to the laser machining head is condensed by the condensing lens, goes through the inside of the laser machining head, and is finally radiated from the nozzle unit to a workpiece. In accordance with the radiation of the laser beam, the laser machining head cuts a workpiece by jetting assist gas from the nozzle unit and blowing the melt of the workpiece.

In such a laser machining head, the laser beam goes through the condensing lens in laser machining, thus the temperature of the condensing lens increases. For this reason, in order to prevent deformation of the condensing lens caused by the temperature increase, a so-called thermal lens phenomenon, a method for cooling the condensing lens with assist gas is proposed. For instance, Patent Literature 1 describes a laser machining head that has a gas path in the holder on the periphery of the lens and lens receiver and cools the lens with assist gas going through the gas path.

In such a laser machining head, spatter and dust generated in laser machining can adhere to the condensing lens. Thus, a method for preventing adhesion of spatter and dust to the condensing lens using the assist gas is proposed. For instance, Patent Literature 2 describes a laser machining head in which adhesion of spatter and dust to the condensing lens is prevented by blowing an assist gas flow onto the surface of the condensing lens.

With reference to FIG. 6, a specific description is provided. FIG. 6 is a drawing showing laser machining head 900 of the conventional laser machining apparatus. As shown in FIG. 6, conventional laser machining lead 900 includes lens holder 901, condensing lens 902, lens receiver 903, lens retainer 904, guide ring 905, sleeve 906, nozzle holder 907, and nozzle 908. Condensing lens 902 is held in lens holder 901 via lens receiver 903 and lens retainer 904. Lens holder 901 has gas introduction hole 909 on the side face. Under lens holder 901, guide ring 905 is fixed. Further, sleeve 906, nozzle holder 907, and nozzle 908 are disposed under guide ring 905.

Along the outer peripheral edge of the top end of guide ring 905 of laser machining head 900, inclined guide surface 910 is disposed. Along the inner peripheral edge of the tip of lens retainer 904, inclined guide surface 911 is disposed. The assist gas introduced from gas introduction port 909 is blown onto condensing lens 902 by inclined guide surfaces 910, 911, and is finally jetted to workpiece W from nozzle 908.

CITATION LIST

Patent Literature

PTL 1: Japanese Utility Model Unexamined Publication No. S63-34590

PTL 2: Japanese Patent Unexamined Publication No. H10-216977

SUMMARY OF THE INVENTION

In the conventional laser machining head described in Patent Literature 1, the exhaust nozzle of the assist gas is oriented to the direction parallel to the bottom surface of the condensing lens, thus the assist gases are jetted from the tip of the laser machining head while colliding with each other. In the laser machining head described in Patent Literature 2, the assist gas is jetted to the condensing lens. For this reason, the flow of the assist gas directed to the tip of the conventional laser machining head is weak, which weakens the action of pushing back the spatter and dust entering from the tip of the laser machining head. When the opening at the tip of the laser machining head (the tip of the nozzle) is increased to ensure the optical path of the laser beam, the discharging force of the spatter and dust caused by the assist gas is further weakened. Thus, adhesion of the spatter and dust to the condensing lens cannot be prevented sufficiently.

The technique of the present disclosure provides a laser machining head that addresses the above problems.

In order to address the above problems, the laser machining head of the present disclosure includes a collimation lens, a focusing lens, and a nozzle unit. The collimation lens makes the laser beams parallel. The focusing lens condenses the paralleled laser beams, and the condensed laser beams go through the nozzle unit. Further, the nozzle unit includes a protective member, an inner nozzle, an outer nozzle, a nozzle holding section, and an orifice. The protective member transmits the laser beams and the laser beams transmitted through the protective member go through the inner nozzle. The outer nozzle is disposed outside the inner nozzle and the nozzle holding section holds the inner nozzle and the outer nozzle. The orifice is in contact with the inner nozzle and is interposed between the nozzle holding section and the outer nozzle. The nozzle holding section has a first gas path that connects the air supply port disposed in the nozzle holding section and the orifice. The orifice has a third gas path that connects a second gas path disposed between the inner nozzle and the outer nozzle, and the first gas path. In the vicinity of the tip of the nozzle unit, an opening connected to the second gas path is disposed.

The laser machining head of the present disclosure can prevent adhesion of spatter and dust to the condensing lens sufficiently.

BRIEF DESCRIPTION OF DRAWINGS

FIG. 2(a) shows a state where a shield holder is taken out of the laser machining head; FIG. 2(b) shows a state where the shield holder is housed in the laser machining head.

FIG. 3(a) shows a state where the shield holder is disassembled; FIG. 2(b) shows a state where the shield holder is assembled.

DESCRIPTION OF EMBODIMENT

Exemplary Embodiment

Figure 1:
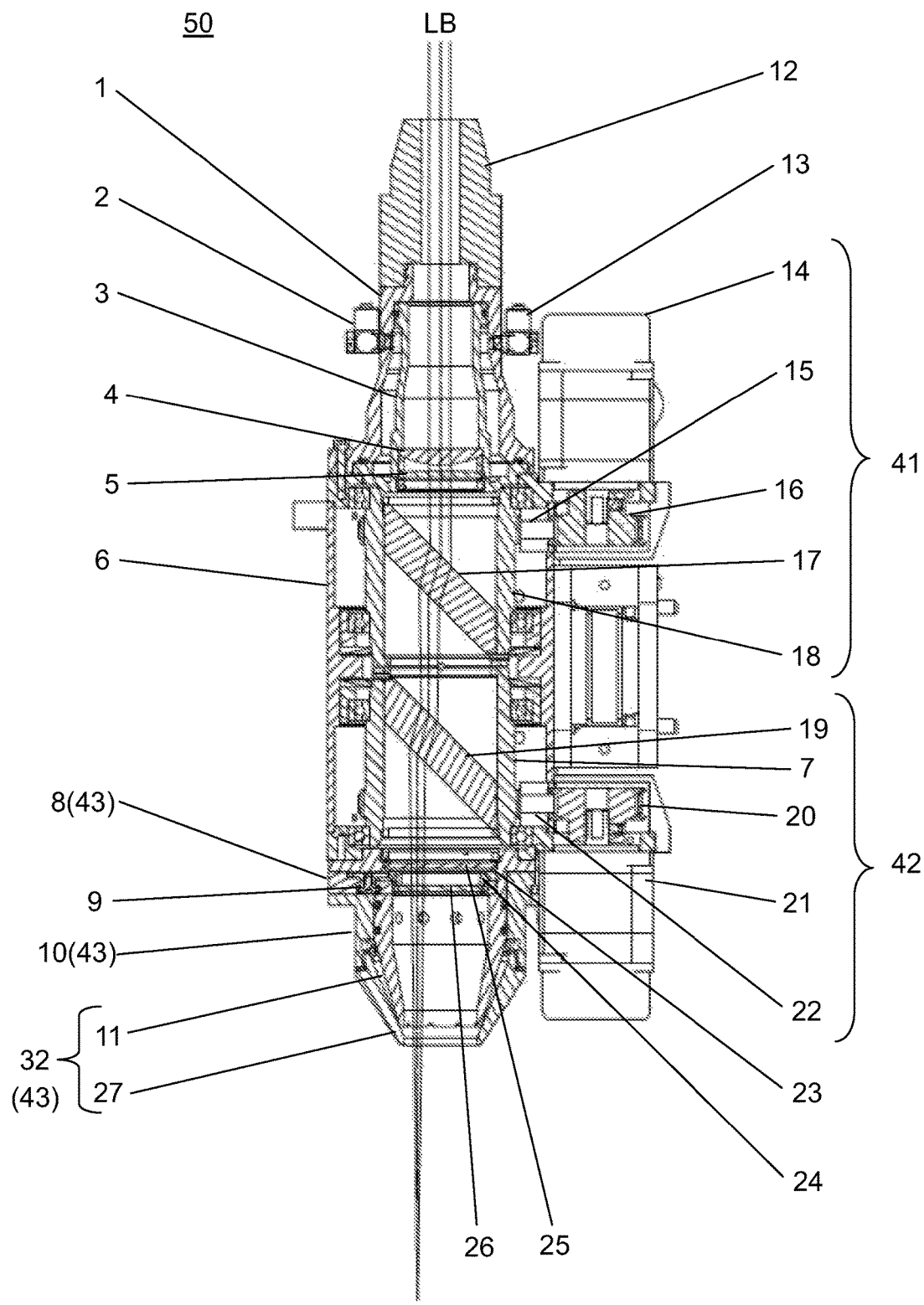
FIG. 1 is a sectional view showing a laser machining head in accordance with an exemplary embodiment.
Figure 2:
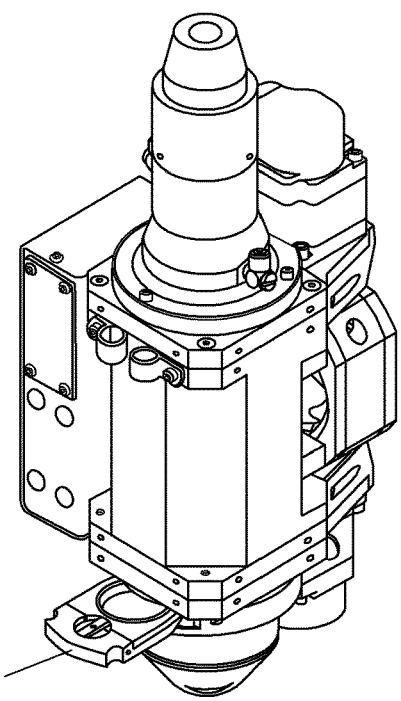
FIG. 2 is a perspective view showing the laser machining head in accordance with the exemplary embodiment.
Figure 2:
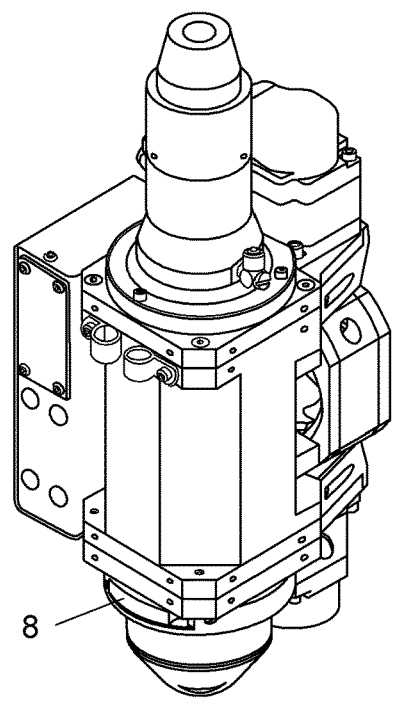
Figure 3:
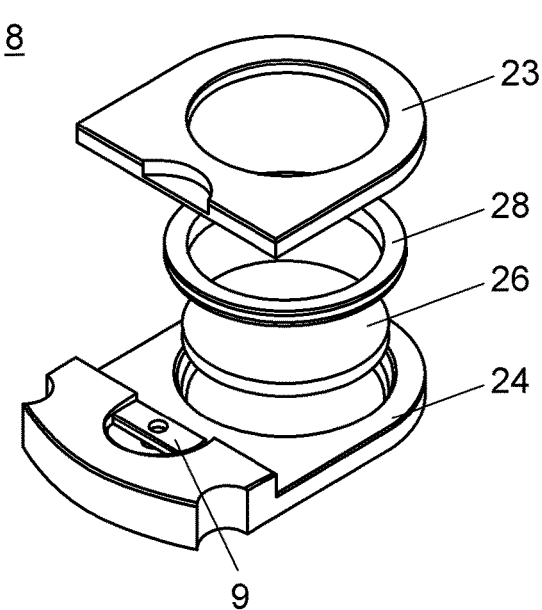
FIG. 3 is a perspective view showing the shield holder in accordance with the exemplary embodiment.
Figure 3:
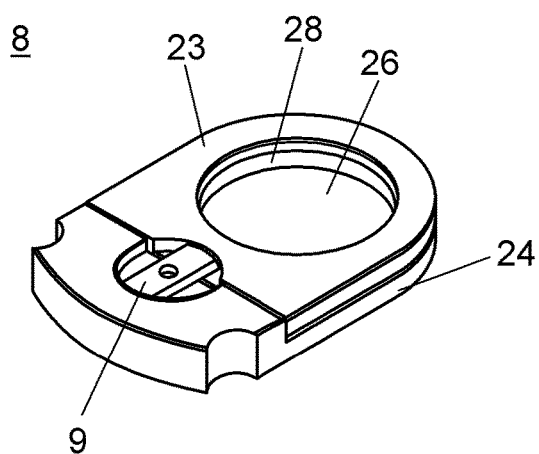
Figure 4:
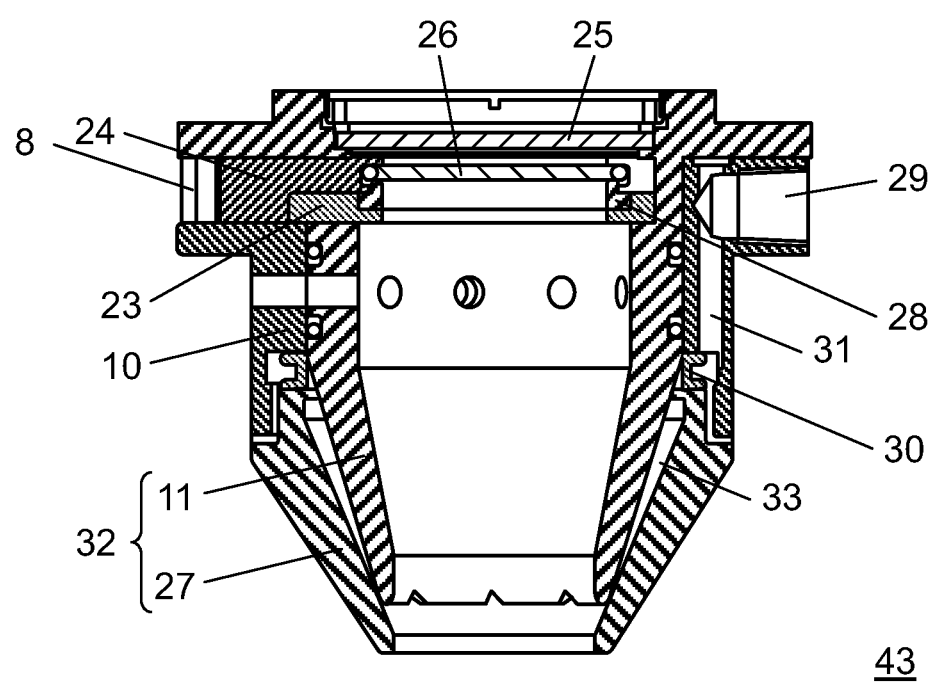
FIG. 4 is a sectional view of a nozzle unit in accordance with the exemplary embodiment.
Figure 5:
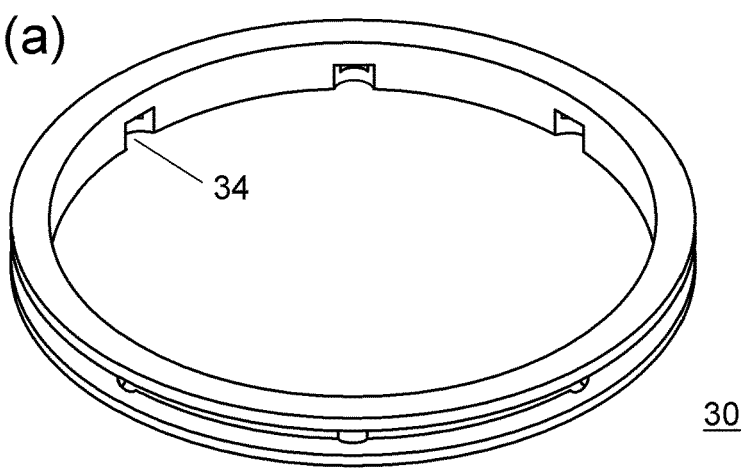
FIG. 5 is a drawing of an orifice in accordance with the exemplary embodiment.
Figure 5:
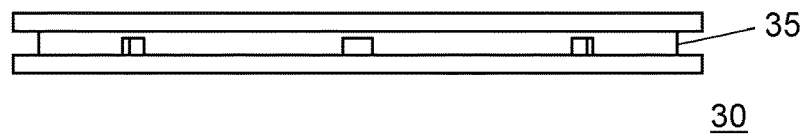
Figure 5:
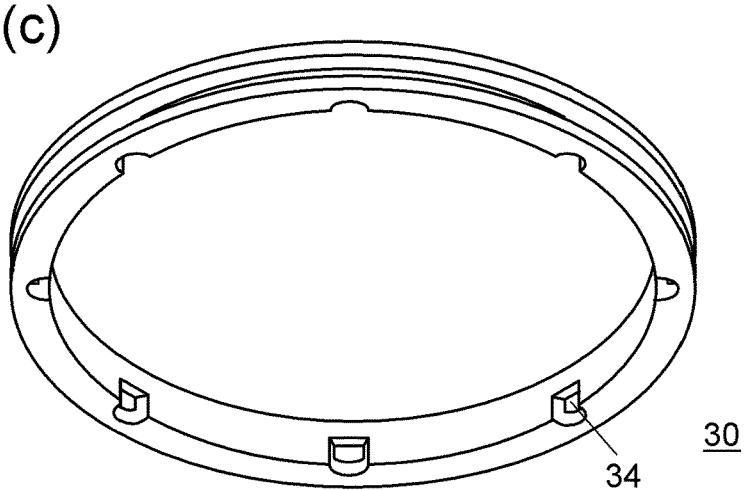
Figure 6:
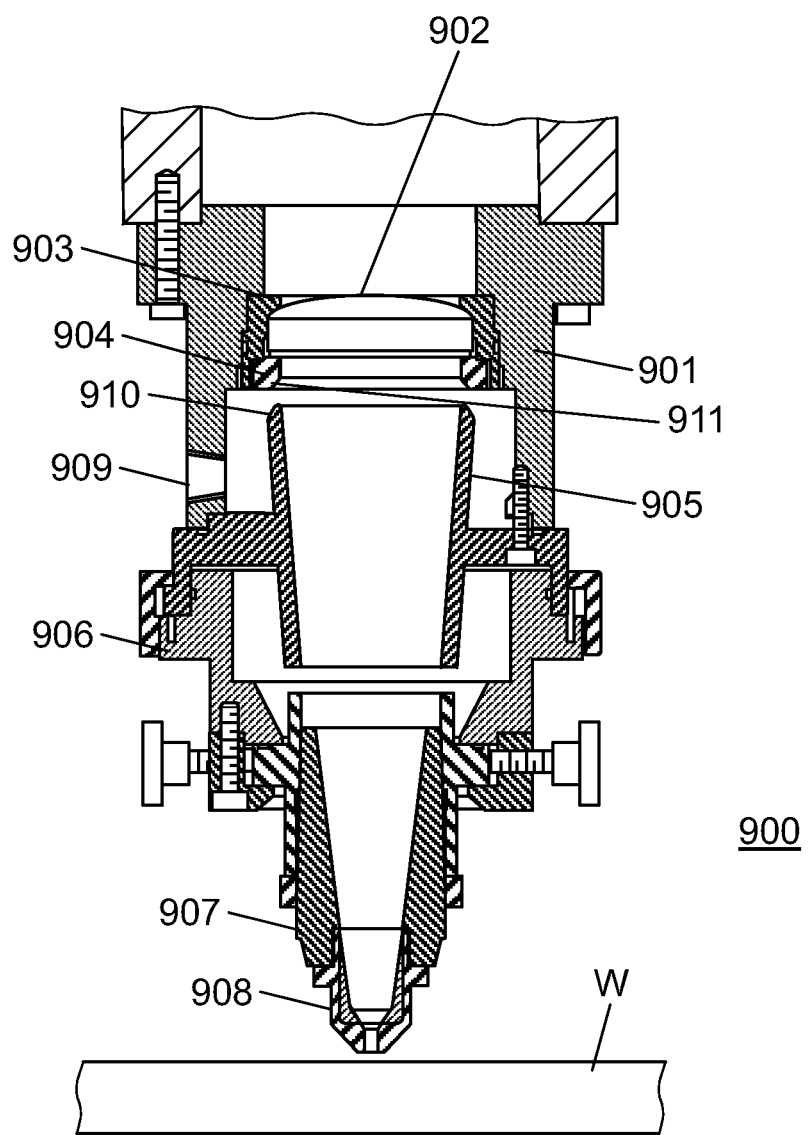
FIG. 6 is a sectional view showing a conventional laser machining head.

Hereinafter, a description is provided for the exemplary embodiment of the present disclosure with reference to FIG. 1 through FIG. 5. FIG. 1 is a sectional view showing laser machining head 50 in accordance with the exemplary embodiment. FIG. 2 is a perspective view showing laser machining head 50 in accordance with the exemplary embodiment. FIG. 2(a) is a perspective view showing a state where shield holder 8 is taken out of laser machining head 50; FIG. 2(b) is a perspective view showing a state where shield holder 8 is housed in laser machining head 50. FIG. 3 is a perspective view showing shield holder 8 in accordance with the exemplary embodiment. FIG. 3(a) is a perspective view showing a state where shield holder 8 is disassembled; FIG. 3(b) is a perspective view showing a state where shield holder 8 is assembled. FIG. 4 is a sectional view of nozzle unit 43 in accordance with the exemplary embodiment. FIG. 5 is a drawing of orifice 30 in accordance with the exemplary embodiment. FIG. 5 (a) is a top perspective view of orifice 30, FIG. 5 (b) is a side view of orifice 30, and FIG. 5 (c) is a bottom perspective view of orifice 30.

First, with reference to FIG. 1, a specific description is provided for laser machining head 50. Laser machining head 50 includes connector 12, lens body 1, body case 6, shield holder 8, nozzle unit 43, and servomotors 14, 21. Shield holder 8 is detachable with respect to nozzle unit 43 (detailed configuration shown in FIG. 4). However, connector 12, lens body 1, body case 6, nozzle unit 43, and servomotors 14, 21 may be configured so that a plurality of elements is integrated into one.

(Connector 12)

Laser machining head 50 includes connector 12, and is connected to an optical fiber via connector 12. Laser beams LB are emitted from the end of the optical fiber into laser machining head 50 while spreading at a constant angle.

(Lens Body 1)

Lens body 1 holds lens holder 3 to which collimation lens 4 and focusing lens 5 are fixed. Collimation lens 4 makes laser beams LB emitted from the exit end face of the optical fiber parallel to each other. The laser beams paralleled by collimation lens 4 are focused on a work point on a workpiece by focusing lens 5. In collimation lens 4 in the exemplary embodiment, diameter φ=30 mm and F value representing the brightness of the lens is 80. In focusing lens 5, diameter φ=30 mm and F value is 500. Each of collimation lens 4 and focusing lens 5 is made by providing anti-reflection (AR) coating on a plano-convex lens made of synthetic quarts glass. Each of collimation lens 4 and focusing lens 5 is not limited to a plano-convex lens, and may be a lens subjected to correction of spherical aberration, such as an aspherical lens.

Lens body 1 has cooling water hose connectors 2, 13. On the outer peripheral part of lens holder 3, i.e. between lens holder 3 and lens body 1, a flowing water channel is disposed. Cooling water is introduced from cooling water hose connector 2 to lens body 1, and the cooling water can be discharged from cooling water hose connector 13 via the flowing water channel. Thereby, the cooling water can be circulated in the flowing water channel, and collimation lens 4 and focusing lens 5 can be cooled indirectly via lens holder 3. This operation can prevent the thermal lens effect caused by laser beams LB in collimation lens 4 and focusing lens 5. The thermal lens effect is a phenomenon in which the focus position of the lens is changed by the thermal deformation. Lens body 1 and lens holder 3 determine the optical positional relation between the exit end face of the optical fiber and collimation lens 4 and focusing lens 5. The cooling water further can reduce the thermal expansion of lens holder 3 and lens body 1, and prevents a change in the focus position caused by a change in the optical positional relation. The cooling water circulates the entire part of the inside of laser machining head 50 and may prevent adverse effects caused by the heat from other optical members.

(Body Case 6)

In body case 6, servomotor 14 (a first driver), timing belt 15 (a first transmission member), timing belt pulley 16 (a first rotating member), and parallel plate 17 (a first parallel plate), and holder 18 (a first holder) are disposed. These elements form optical unit 41 (a first optical unit). Parallel plate 17 is fixed in cylindrical holder 18 whose two ends are held by bearings. On the outer peripheral surface of holder 18, a timing belt pulley (not shown) is disposed. Holder 18 is rotated by servomotor 14 via timing belt 15. Specifically, holder 18 is rotated around a first rotating axis. The direction of the first rotating axis is the same as the optical axis direction of the laser beam output from laser machining head 50. Servomotor 14 is a 50 W brushless DC servomotor with a serial encoder, a so-called AC servomotor.

In the exemplary embodiment, the deceleration ratio of the rotation of timing belt pulley 16 to the rotation of parallel plate 7 is 32:60. The position control resolution of servomotor 14 is 2048 ppr. Therefore, the position control resolution of first optical unit 41 is 4.2 μm, which is a sufficient resolution with respect to the precision of the radiation position of the laser beam. The maximum speed of the movement of the radiation position of the laser beam is equal to or greater than 123 m/min, which is a speed sufficient for practical laser machining such as laser welding. The operating condition settings in this exemplary embodiment are as follows: the maximum output rotating speed is 14400°/sec and the maximum acceleration speed is 300000°/sec$^2$.

Further, body case 6 includes servomotor 21 (a second driver), timing belt 22 (a second transmission member), timing belt pulley 20 (a second rotating member), parallel plate 19 (a second parallel plate), and holder 7 (a second holder). These elements form optical unit 42 (a second optical unit). Parallel plate 19 is fixed to cylindrical holder 7 whose two ends are held by bearings. On the outer peripheral surface of holder 7, a timing belt pulley (not shown) is disposed, and holder 7 is rotated by servomotor 21 via timing belt 22. Specifically, holder 7 is rotated around a second rotating axis. The direction of the second rotating axis is the same as the optical axis direction of the laser beam output from laser machining head 50. Servomotor 21 is a 50 W brushless DC servomotor with a serial encoder, a so-called AC servomotor.

That is, optical unit 41 and optical unit 42 have an identical configuration and corresponding components in each unit are identical to each other. With this configuration, the response balance of two optical units 41, 42 are made the same and control is easily performed. In optical unit 41 and optical unit 42, the direction of the first rotating axis and the direction of the second rotating axis are the same, and the optical units are disposed symmetrically in body case 6. That is, the optical units are disposed symmetrically with respect to a plane perpendicular to the first rotating axis (and the second rotating axis). In FIG. 1, optical unit 41 and optical unit 42 are disposed vertically symmetrically. When optical units are disposed in this manner and servomotor 14 and servomotor 21 are rotated in the same direction, the rotating direction of parallel plate 17 and the rotating direction of parallel plate 19 are opposite to each other. When the rotating direction of servomotor 14 for driving parallel plate 17 is reversed, the rotating direction of parallel plate 17 and the rotating direction of parallel plate 19 can be made the same.

In order to reduce the size of laser machining head 50 and increase the laser radiation range of laser machining head 50, it is preferable to dispose optical unit 41 and optical unit 42 so that the first rotating axis corresponds to the second rotating axis. It is preferable that the direction of the first rotating axis and the direction of the second rotating axis are the same as the optical axis direction of laser beams LB emitted from the optical fiber. It is also preferable that the first rotating axis and the second rotating axis correspond to the optical axis of laser beams LB emitted from the optical fiber.

Next, a description is provided for the behavior of the laser beams in optical units 41, 42.

The laser beams having passed through focusing lens 5 refract twice (in incident on parallel plate 17 and in exit from parallel plate 17) when passing through parallel plate 17. Thus, the laser beam is parallel-shifted by the amount determined by the thickness of parallel plate 17, the inclination angle of parallel plate 17, i.e. the installation angle of parallel plate 17, with respect to the first rotating axis, and the refractive index of parallel plate 17. That is, the optical axis (a first optical axis) of the laser beam incident on parallel plate 17 and the optical axis (a second optical axis) of the laser beam emitted from parallel plate 17 are in the same direction and in displaced positions. This positional relation applies to parallel plate 19 having the same configuration. That is, the optical axis (a second optical axis) of the laser beam incident on parallel plate 19 and the optical axis (a third optical axis) of the laser beam emitted from parallel plate 19 are in the same direction and in displaced positions. Each of parallel plate 17 and parallel plate 19 in this exemplary embodiment is made of synthetic quarts glass in which thickness t=13 mm, the inclination angle with respect to the first rotating axis (the second rotating axis) is 45°, and the refractive index is 1.44963. In this case, the laser beam (the optical axis of the laser beam) having passed through parallel plate 17 shifts by 4.1 mm. Thereafter, the laser beam (the optical axis of the laser beam) shifts by 4.1 mm also when passing through parallel plate 19. Therefore, the working range of the laser beam in the exemplary embodiment is in a circle 8.2 mm in radius, i.e. 16.4 mm in diameter.

(Nozzle Unit 43)

Next, a description is provided for the structure of the tip of laser machining head 50.

As shown in FIG. 1, nozzle unit 43 is connected to the vicinity of body case 6, and protective glass 25 is fixed to the top part of nozzle unit 43. Nozzle unit 43 has inner nozzle 11 and outer nozzle 27 in nozzle holding section 10. The tip of body case 6 is the end on the laser beam exit side. Nozzle unit 43 is structured so that shield holder 8 including protective glass 26 (protective member) is housed on the side closer to the tip of protective glass 25. That is, shield holder 8 is detachable with respect to nozzle unit 43, and protective glass 26 is detachable with respect to nozzle unit 43.

In the exemplary embodiment, protective glass 25 has diameter φ=40 mm, and protective glass 26 has diameter φ=30 mm. In both protective glasses, window material having thickness t=2 mm and made of synthetic quarts glass is subjected to AR coating. Protective glass 25 is fixed to laser machining head 50 (specifically, nozzle unit 43) by a thread ring (not shown).

Next, with reference to FIG. 2, a specific description is provided for protective glass 26 and shield holder 8. In consideration of maintainability, protective glass 26 is disposed on shield holder 8 that slides in the direction orthogonal to the optical axis direction of the laser beams and detachable with respect to laser machining head 50. Protective glass 26 is taken out from laser machining head 50 by taking out shield holder 8 from laser machining head 50, and is disposed in laser machining head 50 by fitting shield holder 8 to laser machining head 50. FIG. 2(a) is a drawing showing a state where shield holder 8 is taken out from laser machining head 50. FIG. 2 (b) is a drawing showing a state where shield holder 8 is mounted on laser machining head 50.

Further, with reference to FIG. 3, shield holder 8 is described. FIG. 3 (a) is a perspective view of shield holder 8 including protective glass 26. FIG. 3(b) is an assembly drawing of shield holder 8 including protective glass 26. Shield holder 8 is formed of first member 23 and second member 24 divided into two parts and O ring 28 so as to sandwich protective glass 26. First member 23 and second member 24 can be easily coupled and decoupled by the operation of fixing lever 9. Protective glass 26 is held in the following manner: the circumferential direction thereof is held by elastic deformation force of O ring 28; and the protective glass is held in the axial direction by being sandwiched between first member 23 and second member 24. Operating lever 9 enables first member 23 and second member 24 to be decoupled easily. Thus, protective glass 26 can be exchanged easily without using any tool.

The following configuration may also be used. No protective glass 25 is disposed and only protective glass 26 detachable with respect to laser machining head 50 is disposed. However, in this case, when protective glass 26 is exchanged in the general use environment of laser machining head 50, foreign matter may enter laser machining head 50 and adhere to parallel plate 19, for example, in removal of protective glass 26. Therefore, providing two protective glasses 25, 26 as described in the exemplary embodiment poses no problem even when protective glass 26 is exchanged in the general use environment of laser machining head 50. Further, this configuration can enhance convenience and is preferable.

Next, a description is provided for prevention of adhesion of spatter and dust to protective glass 26 during laser machining, with reference to FIG. 4 and FIG. 5. FIG. 4 is a sectional view of nozzle unit 43 in accordance with the exemplary embodiment. FIG. 5 is a drawing of orifice 30 in accordance with the exemplary embodiment.

In laser machining head 50 shown in FIG. 1, on the output end side of the laser beams with respect to protective glass 26, nozzle 32 in a hollow truncated cone shape formed of inner nozzle 11 and outer nozzle 27 are disposed. As shown in FIG. 4, nozzle unit 43 includes shield holder 8, nozzle holding section 10, inner nozzle 11, and outer nozzle 27. Inner nozzle 11 is in contact with outer nozzle 27 in the vicinity of the tip of nozzle 32. At the tip of inner nozzle 11, an opening is formed by radially disposed grooves (cutouts). Air supply port 29 is disposed in nozzle holding section 10, and annular space 31 (a first gas path) connected to air supply port 29 is provided inside nozzle holding section 10. Orifice 30 is disposed in contact with inner nozzle 11 so as to be sandwiched between nozzle holding section 10 and outer nozzle 27. Orifice 30 is connected to space 31. Inner nozzle 11 and outer nozzle 27 are combined so that annular space 33 (a second gas path) is provided therebetween.

Here, a specific description is provided for orifice 30 with reference to FIG. 5. As shown in FIG. 5 (a), below the inner circumference of orifice 30, grooves are formed at regular intervals. As shown in FIG. 5 (b), the side face of orifice 30 is recessed inwardly at the center than at the top side and the bottom side along the entire circumference and is connected to the inner circumferential grooves. That is, as shown in FIGS. 5 (a), (b), and (c), orifice 30 has holes 34 (third gas paths) that connect outer circumferential surface 35 and the bottom side of orifice 30. Holes 34 are provided at regular intervals in orifice 30, and are through-holes each having an L shape in the sectional direction that connects space 31 and space 33 as shown in FIG. 4. Specifically, space 31 and the openings on the outer peripheral surface of orifice 30 are connected, and space 33 and the openings at the bottom face of orifice 30 are connected. With this configuration, the assist gas introduced from air supply port 29 can be uniformly supplied from space 31 to space 33 via holes 34 in orifice 30.

As shown in FIG. 4, since inner nozzle 11 has cutouts at the tip, openings are disposed at regular intervals in the part in contact with outer nozzle 27, and the assist gas from space 33 can be jetted in an annular shape substantially uniformly. With this configuration, nozzle unit 43 can exhausts a high-speed air jet toward the bottom direction of laser machining head 50, and prevent entry of spatter and dust into laser machining head 50 in laser machining. Further, since this air jet is blown to a workpiece, stagnation of dust in the vicinity of a work point of workpiece W can be prevented. The dust causes reflection, refraction and absorption of the laser beams, thus deteriorating the laser output at the work point. Inner nozzle 11 and outer nozzle 27 are held by nozzle holding section 10.

The tip of outer nozzle 27 is detachable with respect to nozzle holding section 10, and the tip can be solely replaced when being consumed or damaged. This configuration can reduce the maintenance cost of the nozzle.

The minimum diameter of inner nozzle 11 having grooves at the tip is larger than the minimum diameter of replaceable outer nozzle 27, and outer nozzle 27 covers inner nozzle 11. This configuration can prevent the damage of the tip of inner nozzle 11 and the clogging of spatter.

The opening at the tip of nozzle 32 is larger than the radiation range of the laser beams changing with rotation of parallel plates 17, 19. However, since nozzle unit 43 of laser machining head 50 of the exemplary embodiment jets the assist gas at high speed, downward, in a uniform annular shape, adhesion of spatter and dust to protective glass 26 can be prevented.

Orifice 30 and outer nozzle 27 may be formed integrally.

INDUSTRIAL APPLICABILITY

A laser machining head of the present disclosure can sufficiently prevent adhesion of spatter and dust to a condensing lens and is industrially useful for a laser machining head for use in remote laser machining, for example.

REFERENCE MARKS IN THE DRAWINGS

1 Lens body
2, 13 Cooling water hose connector
3 Lens holder
4 Collimation lens
5 Focusing lens
6 Body case
7, 18 Holder
8 Shield holder
9 Lever
10 Nozzle holding section
11 Inner nozzle
12 Connector
14, 21 Servomotor
15, 22 Timing belt
16, 20 Timing belt pulley
17, 19 Parallel plate
23 First member
24 Second member
25, 26 Protective glass
27 Outer nozzle
28 O ring
29 Air supply port
30 Orifice
31 Space
32 Nozzle
33 Space
34 Hole (third gas path)
35 Outer peripheral surface
41, 42 Optical unit
43 Nozzle unit
50 Laser machining head
W Workpiece

The invention claimed is:
1. A laser machining head comprising:
a collimation lens for making a laser beam parallel;
a focusing lens for condensing the paralleled laser beam; and
a nozzle unit through which the condensed laser beam is transmitted, the nozzle unit including:
a protective member for transmitting the laser beam;
an inner nozzle through which the laser beam transmitted through the protective member passes;
an outer nozzle disposed outside the inner nozzle;
a nozzle holding section for holding the inner nozzle and the outer nozzle; and
an orifice, having a ring shape surrounding a hollow space, in contact with the inner nozzle and interposed between the nozzle holding section and the outer nozzle,
wherein the nozzle holding section has a first gas path connecting an air supply port disposed in the nozzle holding section and the orifice, the inner nozzle and the outer nozzle forms a second gas path between the inner nozzle and the outer nozzle, the orifice has a third gas path for connecting the second gas path to the first gas path, the orifice has an inner side face facing the hollow space, an outer side face opposite to the inner side face, and a bottom face connected to the inner side face and the outer side face, a plurality of the third gas paths is disposed in the orifice at regular intervals, the orifice has a plurality of through-holes therein connecting the outer side face to the bottom face, each of the plurality of through-holes constitutes a respective one of the third gas paths, the outer side face has a top portion, a bottom portion, and a recessed portion between the top portion and the bottom portion, the recessed portion extends along an entire circumference of the outer side face, the each of the plurality of through-holes connects the recessed portion and the bottom face, and in a vicinity of a tip of the nozzle unit, an opening connected to the second gas path is disposed.

2. The laser machining head of claim 1, wherein the first gas path forms an annular cavity shape disposed inside the nozzle holding section.

3. The laser machining head of claim 1, wherein the second gas path forms an annular cavity shape disposed between the inner nozzle and the outer nozzle.

4. The laser machining head of claim 1, wherein in the vicinity of the tip of the nozzle unit, a plurality of openings connected to the second gas path are disposed, the plurality of openings including the opening, the plurality of openings are disposed in a boundary between the inner nozzle and the outer nozzle at regular intervals; and cutouts are formed in the inner nozzle, each of the cutouts constituting a respective one of the plurality of openings.

5. The laser machining head of claim 1, wherein the protective member is detachable with respect to the nozzle unit.

6. The laser machining head of claim 1, further comprising:

a first parallel plate for shifting a first optical axis of the condensed laser beam to a second optical axis, a first driver for rotating the first parallel plate around a first rotating axis, a second parallel plate for shifting the optical axis of the laser beam shifted to the second optical axis of the laser beam to a third optical axis, and a second driver for rotating the second parallel plate around a second rotating axis, wherein a direction of the first rotating axis is identical to a direction of the second rotating axis.

7. The laser machining head of claim 6, further comprising:

a first holder for holding the first parallel plate;

a first rotating member, disposed on an outer peripheral surface of the first holder, for rotating the first holder;

a first transmission member for transmitting a driving force of the first driver to the first rotating member;

a second holder for holding the second parallel plate;

a second rotating member, disposed on an outer peripheral surface of the second holder, for rotating the second holder; and a second transmission member for transmitting a driving force of the second driver to the second rotating member, wherein the first driver, the first parallel plate, the first holder, the first rotating member, and the first transmission member form a first optical unit, the second driver, the second parallel plate, the second holder, the second rotating member, and the second transmission member form a second optical unit, and a shape of the first optical unit is identical to a shape of the second optical unit.

8. The laser machining head of claim 4, wherein the inner nozzle has a tip contacting the outer nozzle, and the cutouts are provided in the tip of the inner nozzle.

9. A laser machining head comprising:

a collimation lens for making a laser beam parallel;

a focusing lens for condensing the paralleled laser beam; and a nozzle unit through which the condensed laser beam is transmitted, the nozzle unit including:

a protective member for transmitting the laser beam;

an inner nozzle through which the laser beam transmitted through the protective member passes;

an outer nozzle disposed outside the inner nozzle;

a nozzle holding section for holding the inner nozzle and the outer nozzle; and an orifice, having a ring shape, in contact with the inner nozzle and interposed between the nozzle holding section and the outer nozzle;

a first parallel plate for shifting a first optical axis of the condensed laser beam to a second optical axis;

a first driver for rotating the first parallel plate around a first rotating axis;

a second parallel plate for shifting the optical axis of the laser beam shifted to the second optical axis of the laser beam to a third optical axis;

a second driver for rotating the second parallel plate around a second rotating axis;

a first holder for holding the first parallel plate;

a first rotating member, disposed on an outer peripheral surface of the first holder, for rotating the first holder;

a first transmission member for transmitting a driving force of the first driver to the first rotating member;

a second holder for holding the second parallel plate;

a second rotating member, disposed on an outer peripheral surface of the second holder, for rotating the second holder; and a second transmission member for transmitting a driving force of the second driver to the second rotating member, wherein the nozzle holding section has a first gas path connecting an air supply port disposed in the nozzle holding section and the orifice, the orifice has a third gas path for connecting a second gas path disposed between the inner nozzle and the outer nozzle, and the first gas path, a plurality of the third gas paths is disposed in the orifice at regular intervals, each of the third gas paths is a through-hole connecting a side face and a bottom face of the orifice, and in a vicinity of a tip of the nozzle unit, an opening connected to the second gas path is disposed, wherein a direction of the first rotating axis is identical to a direction of the second rotating axis, wherein the first driver, the first parallel plate, the first holder, the first rotating member, and the first transmission member form a first optical unit, the second driver, the second parallel plate, the second holder, the second rotating member, and the second transmission member form a second optical unit, and a shape of the first optical unit is identical to a shape of the second optical unit.

\* \* \* \* \*